United States Patent [19]
Hacker

[11] Patent Number: 5,949,010
[45] Date of Patent: Sep. 7, 1999

[54] MUSICAL BLOCKS

[75] Inventor: L. Leonard Hacker, Washington, D.C.

[73] Assignee: 21st Century Ideas, Ltd., Washington, D.C.

[21] Appl. No.: 08/861,284

[22] Filed: May 21, 1997

[51] Int. Cl.$^6$ .................................................. G09B 15/02
[52] U.S. Cl. ............................................................ 84/476
[58] Field of Search ............................ 84/470 R, 476; 273/146; 434/171, 172

[56] References Cited

U.S. PATENT DOCUMENTS

| | | | |
|---|---|---|---|
| 104,853 | 6/1870 | Costello | 84/476 |
| 430,157 | 6/1890 | Watson | 84/476 |
| 1,772,394 | 8/1930 | Hanselmann | 446/193 |
| 2,879,685 | 3/1959 | Page | 84/470 |
| 2,941,436 | 6/1960 | Ericksen | 84/473 |
| 2,985,453 | 5/1961 | Matisz | 273/145 C |
| 3,795,989 | 3/1974 | Greenberg et al. | 434/339 |
| 4,158,921 | 6/1979 | Stolpen | 35/70 |
| 4,398,892 | 8/1983 | Solomon | 434/259 |
| 4,838,794 | 6/1989 | Coddington | 434/187 |
| 4,846,687 | 7/1989 | White et al. | 434/112 |
| 5,275,567 | 1/1994 | Whitfield | 434/113 |
| 5,447,433 | 9/1995 | Perry, Jr. | 434/171 |

*Primary Examiner*—William M. Shoop, Jr.
*Assistant Examiner*—Shih-yung Hsieh
*Attorney, Agent, or Firm*—Roberts & Abokhair, LLC

[57] ABSTRACT

A music education apparatus for teaching musical concepts. The music education apparatus comprises a block with visual representations on each side designating musical notes, letters representing musical notes, and physical portions on musical instruments, wherein the musical note(s) designated on the other sides are highlighted on the keyboard or other designated physical portion of an instrument. The music education apparatus may also serve as an alarm clock that can be set to sound at a selected time by conventional means, or by lights, sound, temperature, or other stimuli. Voice programming may be featured, whereby a word, name, sentence, etc., is spoken or sung when the alarm sounds. Sides of the music education apparatus may designate one note or a combination of notes, and a keyboard or other physical representation of the playing portion of a musical instrument, wherein a key(s) or string(s) is highlighted to correspond to the note(s) designated on the other sides of the block. Upon activation of a music generator contained within the music education apparatus, the pitch(es) of the designated note(s) is sounded. By including the production of harmonics, the sound producer can also produce the sound of a musical instrument. One embodiment features removable and replaceable sides that thereby permit the sounding of different notes, including combinations of notes (trills, etc.), instruments, and songs or other compositions. Electronic sound chips may be used in conjunction with a power source.

19 Claims, 4 Drawing Sheets

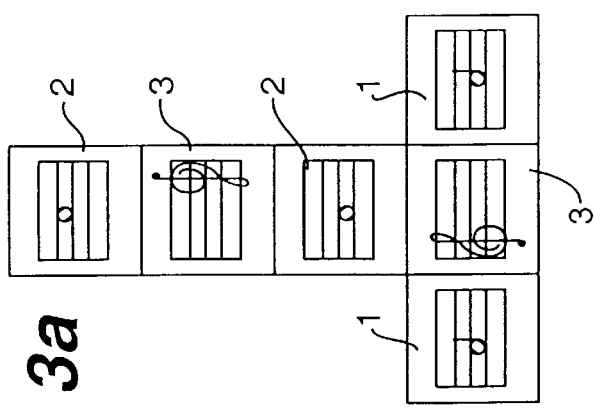
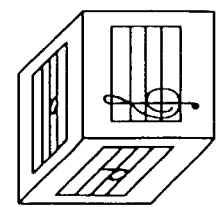
FIG. 1a  FIG. 2a  FIG. 3a
FIG. 1b  FIG. 2b  FIG. 3b

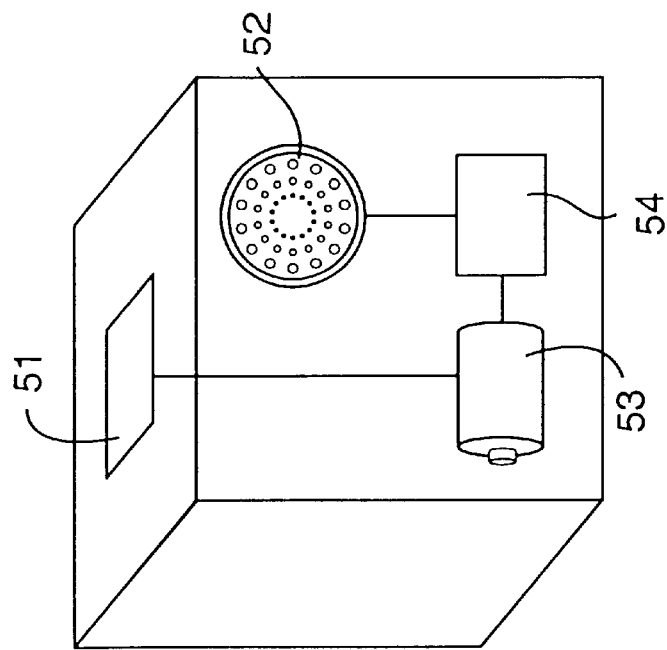
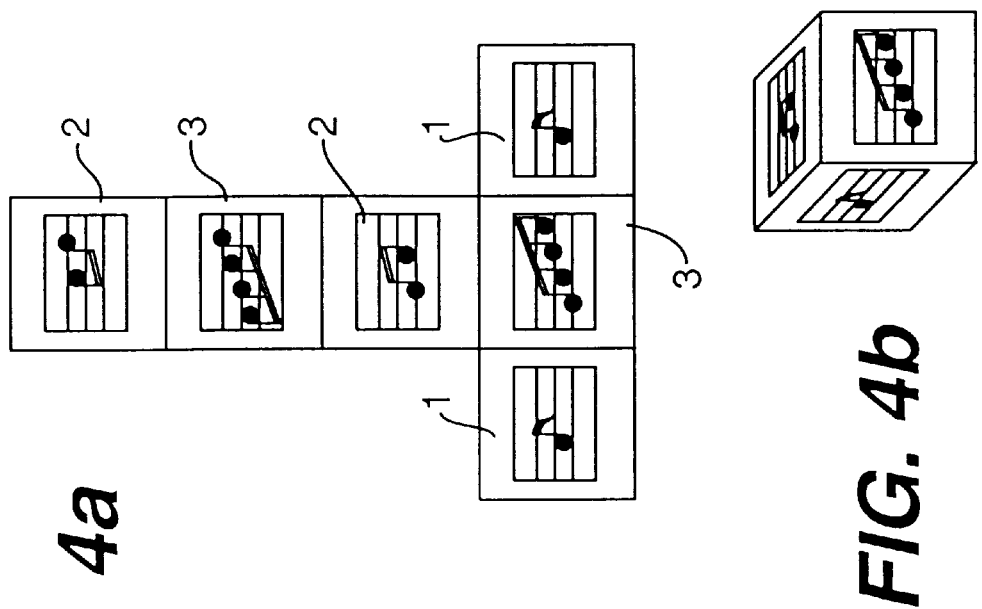

MUSICAL BLOCKS

FIELD OF THE INVENTION

The present invention relates generally to an educational musical toy and/or game for teaching musical concepts. In particular, the present invention relates to a block musical toy and/or game to teach musical note meaning and pitch recognition, music reading, and instrument playing (key, string, finger button or finger hole recognition, including, for example, note-key and pitch-key correspondences).

BACKGROUND OF THE INVENTION

The learning of music comprises learning one or more of the following: pitch and the correspondence between written note and pitch, tempo, staccato or not, degrees of loudness, note duration, correspondence between written note and the production of instrumental sound (e.g., by striking a key, plucking a string, blowing on a reed and pushing a key, pressing a finger button or key lever, placing a finger on a finger hole, etc.), rhythm, the sonic characteristics of the various instruments, writing music, singing, harmony, chords, trills, etc.

Current devices and methods to help students learn music are somewhat limited. United States patents on such devices and methods include U.S. Pat. No. 2,941,436 to Ericksen, which teaches a flat device that is used to identify musical notes printed on a page.

U.S. Pat. No. 2,879,685 to Page teaches the use of a musical teaching device that incorporates a series of squeezable blocks, each of which is labeled with a note between A and G. The squeezable blocks are mounted on a stiff sheet on which is imprinted a G Clef and music lines, and each squeezable block represents a corresponding note thereon. When a block is squeezed, the air that is forced out of the block passes through a reed tuned to the frequency/pitch of the labeled note.

Other general educational devices include blocks used to teach the alphabet and simple words, such as U.S. Pat. No. 4,158,921 to Stolpen. This patent discloses the use of blocks and other geometric shapes with different letters and words on each of the facets. The words may relate to a given topic, such as geography, chemistry, vocabulary, etc.

U.S. Pat. No. 4,846,687 to White, et al. teaches the use of cubic blocks with alphabet and corresponding sign language indicia on the facets. A facet may also include a picture of an item whose name begins with a letter on another facet of the same block.

U.S. Pat. No. 4,838,794 to Coddington discloses the use of blocks to teach the metric system. On each facet is inscribed a metric length (including an imprinted ruler) or a metric volume. A set of blocks, laid end to end, comprises a length of one meter.

U.S. Pat. No. 5,275,567 to Whitfield teaches the use of blocks to teach Braille to sight-impaired children. A front facet may display, for example, the letter A, including the Braille representation; and the opposite or back facet may display only the Braille.

U.S. Pat. No. 5,447,433 to Perry, Jr. utilizes interconnecting blocks with letters and pictures that, upon completion by connecting the blocks in any one of a limited series of predetermined sequences, produces a corresponding unified picture sequence and the word for the picture sequence is spelled.

The above discussed inventions, though helpful within their prescribed limits, do not provide the degree of flexibility and interest-attracting ability that is necessary to adequately teach many of the complexities of music, including both children and adults. Thus, there is a need for a student's music teaching system to teach selected aspects of music whereby the attention of a student is held sufficiently strongly to aid the learning process. In the case of individuals with Attention Deficit Disorder (ADD), there is an even greater need for improvements in attention holding means for student teaching systems. Also, there is a need for a student's music teaching system to teach selected aspects of music whereby there is flexibility sufficient to permit the teaching of more than merely simple concepts, especially to older students and to musically precocious children. One example of a more complex music concept requiring a more flexible student's music teaching system for implementation is that of determining which keys to strike on a piano, for example, and in what order, to produce a desired song. Of course, a need also exists for a more flexible student's music teaching system for determining which strings to pluck or otherwise vibrate (or, generally, which sound initiator to engage) in a given other instrument to produce each note comprising a desired song. Another example of a more complex music concept requiring a more flexible student's music teaching system for implementation is that of composing music, including being able to hear the sequence of notes for a composition in progress or even one completed. Finally, there is a need for a student's music producing system that not only is highly flexible and inexpensive, but also promotes eye-hand coordination and general fine control of the muscles controlling the fingers of the student user.

SUMMARY OF THE INVENTION

In view of the limitations in the prior art, as discussed above, it is an object of the present invention to provide a music teaching device that strongly holds the attention of students, including those with ADD.

Another object of the present invention is to provide a music teaching device that has the flexibility necessary to teach more complex concepts, such as chords, intricate note combinations, etc., to children and adults, regardless of musical ability.

It is another object of the present invention to provide a music teaching device that, by virtue of the auditory feedback, permits the user to determine which piano keys, and their sequence, must be played in order to perform a given song.

Yet another object of the present invention is to provide a music teaching device that, in part by virtue of the auditory feedback, permits the user to determine which strings must be plucked, strummed or otherwise vibrated (or, generally, activation of which other sound producing elements or sound initiators) in a musical instrument in order to perform a given song.

Still another object of the present invention is to provide a music teaching device that, in part by virtue of the auditory feedback, permits the user to more easily compose music.

It is another object of the present invention to provide a music teaching device that simultaneously is flexible, inexpensive, and promotes eye-hand coordination and general fine control of the muscles controlling the fingers of the user.

The present invention accomplishes the above objectives by using special musical blocks, the sides of which carry visual representations of musical indicia. The musical indicia may comprise such items as notes (including single or multiple whole notes, half notes, quarter notes, etc.), the alphabetic representation of those notes (letters A through G), G or treble clefs, F or bass clefs, representations of physical portions of musical instruments (such as key boards, strings, finger holes, finger buttons, key levers and any other such sound initiators and/or sound producers; including also highlighting of the note(s) featured on the musical block), sharps, flats, representations of songs, etc. In the simplest embodiment, cubic blocks comprise: two of the six sides are printed with at least one letter corresponding to one or more notes (between A and G), two carry a representation of a physical section of a piano keyboard (or the sound initiator of another musical instrument) wherein the key corresponding to the single note or multiple notes represented by the block is/are highlighted, and two sides carry a representation of a musical score with the single or multiple notes indicated thereon. The cubic blocks may be made of wood, plastic, cardboard, rubber, metal, firm or reinforced cloth or fabric, or any other material suitable for students known in the art.

When a single note is featured on each block, a unique color may be selected to correspond to each of the seven notes between A and G to further aid the user in quickly identifying each of the notes. In one embodiment, the present invention comprises a set of at least seven blocks, wherein each block comprises a note on a musical scale. Each block comprises at least one side, showing each of the letter designation of a note, the staff position of the note, and the position of the note on a musical instrument. The set comprises at least one block for each note in a musical scale. The blocks each may also contain a reed that is tuned to the indicated note, and a hole through the block to provide a means for air to flow through the reed. The reeds may then be activated by blowing through the connecting hole. The note can also be played by squeezing the block in the case where the blocks are made of a flexible material that is non-porous, such as rubber, plastic, treated fabric, etc. The size of the music blocks may vary, for example, with larger blocks being used for younger and/or less dextrous students.

With respect to the colors used to distinguish the different notes, it is important to realize that the present invention is not bound to any one color scheme; thus, any combination of colors that provides a 1:1 correlation between color and note will suffice. In addition, an alternative embodiment of the present invention uses different shades of the same color to distinguish different octaves for a given note.

One alternative embodiment of the present invention is the use of more than one reed in a music block. For example, in the squeezable musical block having different notes on different front-back pairs of sides, squeezing one set of opposite sides will produce the sound of the notes shown on those sides, and so forth for the other opposite side pairs. In the more rigid blocks, in which notes are produced by blowing through holes/tubes connected to the reeds, the front-back pairs of holes/tubes are matched with the corresponding notes represented on the respective sides of the musical blocks.

Other alternative embodiments of the present invention include the use of representations of keys and other sound initiators other than from a piano, such as strings of a violin, harp, or other string instrument, finger holes on harmonicas and certain wind instruments, key levers and finger buttons on saxophones and other wind instruments, etc.

Another alternative embodiment of the present invention is the use of an internal switch that is activated by mere movement of the block. In addition, other switches, both internal and external, may be used, including switches coupled to sensors (such as for light, sound, pressure, temperature, etc.) so that the block will sound when light or temperature reaches a desired level, etc.

Another alternative embodiment of the present invention incorporates such features as length of note concept (whole, half, quarter, eighth, etc., notes), F (or bass) and G (or treble) clef concepts, sharp and flat concepts, and note combinations.

Yet another alternative embodiment of the present invention includes the use of an electrically powered (for example, by providing a connection to an AC outlet, by a battery housed internally, and/or solar panels placed externally on the block, plus an externally activated switch) sound producer whose output is tuned to match the frequency(ies) of the note(s) designated on the blocks. Using modern electronic sound makers, for example including sound chips, such an electrically powered sound maker also can reproduce the specific sound of the instrument designated on the given block by sounding a tone that comprises the note's pitch plus the harmonic frequencies appropriate to the instrument, and at the appropriate relative amplitudes. Also, note combinations may be reproduced by such modern sound makers, including even an entire song or a symphonic production. In the case of a music block with more than one set of front side-back side combinations of notes, appropriately placed switches will allow activation of the desired note or combination of notes.

A further alternative embodiment of the present invention is the use of a heat and/or light activated sensor that functions as a switch such that, for example, when one or more musical blocks are positioned at night in a window sill or otherwise in a location that will receive the first rays of light in the morning, the note or the combination of notes will play and function as an alarm clock. In addition, sound activated switches/sensors may be employed such that the clapping of hands, for example, will cause the one or more musical blocks to sound. Furthermore, temperature activated switches/sensors may be used so that the musical block is sounded when the temperature reaches a set higher or lower temperature.

Yet another alterative embodiment of the present invention is the incorporation of a programmable alarm clock in a musical block such that the child may select which note or combination of notes, as well as which instrument or instruments, will serve to awaken him on a given day.

Yet a further alternative embodiment of the present invention is the incorporation of voice chips in a programmable alarm clock embodiment such that the child may choose what message is spoken or sung when the alarm sounds, including the incorporation of the child's name in such a spoken or sung message that is selected, hereinafter termed "voice programming."

Yet another embodiment of the present invention is the inclusion of removable and replaceable faces to a musical block such that the child may select not only which instrument or which combination of instruments, but also which combination of notes or even an entire song he desires by virtue of using the appropriate musical chips within each removable and replaceable or face, including the use of electrically conducting interconnections to access the electrical energy of a power source, such as a battery or a solar panel. In addition, electronic displays may be incorporated within the removable and replaceable faces, including, for example, LCD's (liquid crystal displays).

Yet an additional embodiment of the present invention is the inclusion of removable and replaceable faces to a musical block as above such that delays of a second or so occur between the sounding of each of a series of notes, possibly including the intermixing of instruments that may play at different times in a given sequence of notes. Alternatively, a plurality of blocks could perform as a symphony, with each block representing at least one instrument.

A final alternative embodiment of the present invention is the incorporation of higher and lower octaves of notes, especially for the more advanced users.

In yet another embodiment of the invention, the music education apparatus comprises a plurality of sides greater than six sides.

BRIEF DESCRIPTION OF THE DRAWINGS

FIG. 1 shows a music block representing the note B.

FIG. 2 shows a music block with a bass clef (or F clef), B flat, and F sharp.

FIG. 3 shows a music block with a G (or treble) clef, the whole note, and the half note.

FIG. 4 shows a music block with a single eighth note, two adjacent eighth notes, and four consecutive sixteenth notes.

FIG. 5 shows a music block with various parts.

DESCRIPTION OF THE PREFERRED EMBODIMENTS

Figure 6:
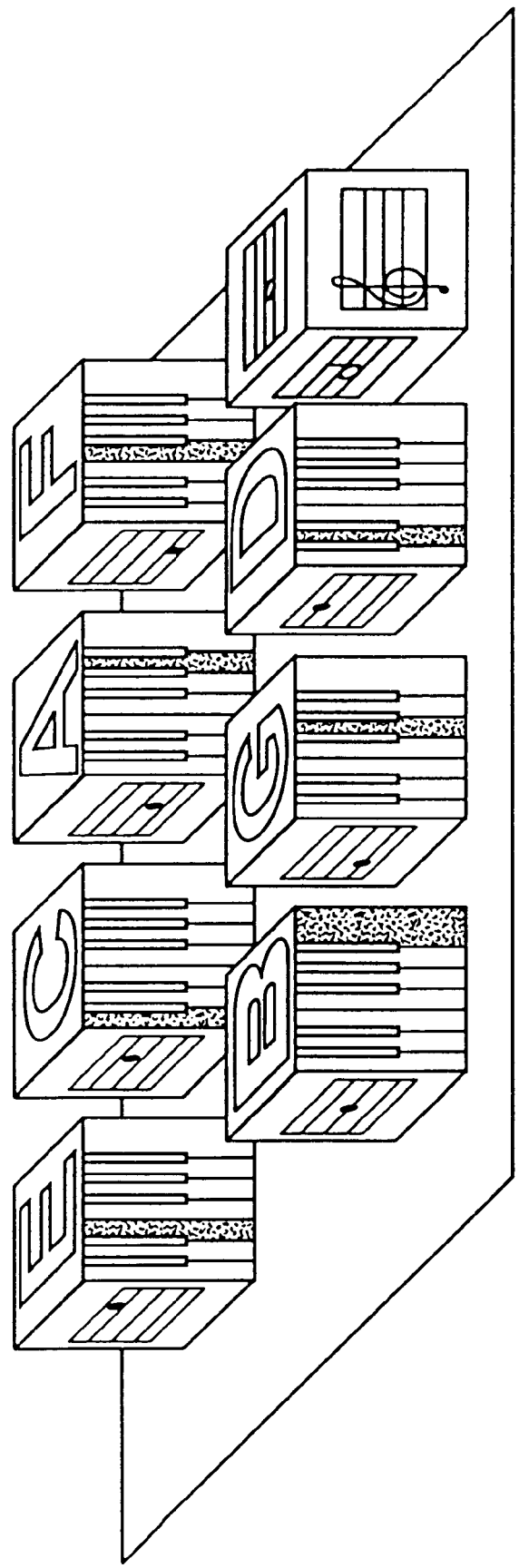
FIG. 6 shows a set of music blocks.
Figure 7A:
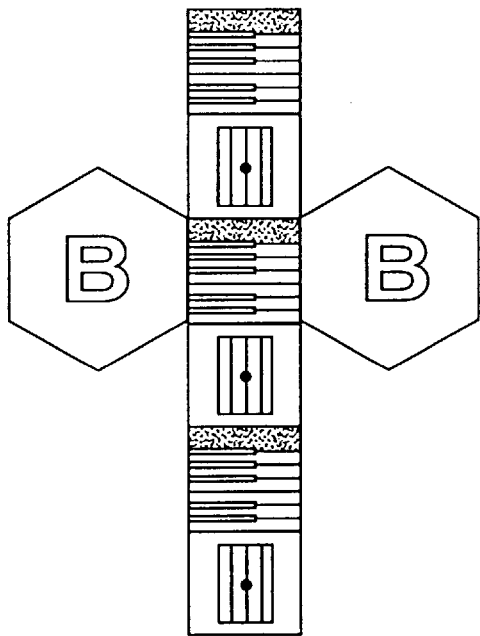
FIG. 7 shows a music block having 8 sides.
Figure 8A:
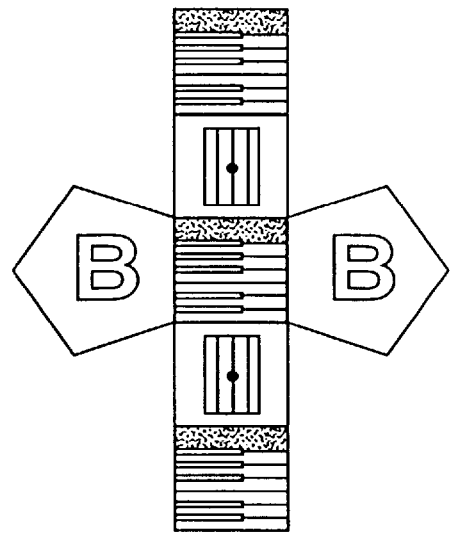
FIG. 8 shows a music block having 7 sides.
Figure 7B:
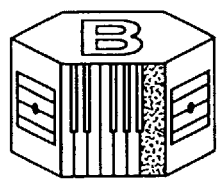
Figure 8B:
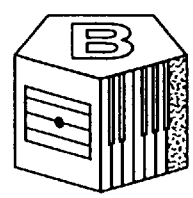

The present invention constitutes a marked advance in the field of educational toys or games for teaching music. Generally, children from age 5 to 10 may benefit most from the advanced features of the present invention, though younger children who are musically precocious may also benefit, as may adults beginning to learn music. In addition, those with ADD will benefit from the present invention because of the advanced features that more strongly hold their attention.

Referring to FIG. 1, in its most elementary embodiment, the present invention comprises a cubic block having six square sides, or three sets of two opposing sides, each side with designations of visual representations of musical indicia. Examples of musical indicia include one or more whole notes, half notes, etc., G or treble clefs, bass or F clefs, representations of physical portions of musical instruments including highlighted keys (or other sound producers or sound initiators, such as keys, strings, finger buttons, key levers, finger holes, etc.), sharps, flats, representations of songs, etc. One set of two opposing sides represents a selected music note between A and G. Another set of two opposing sides shows the selected music note on a music score. The remaining set of two opposing sides shows a visual representation of a physical section of a keyboard with the selected note key highlighted. (In other embodiments, other sound initiators may be used, such as highlighting a string on a visual representation of a physical portion of a string instrument, a finger button, key lever or finger hole on a wind instrument; etc.) Thus, the student not only may learn the notes by name, and the note's position on a music score, but also the corresponding note key or other sound initiator on the keyboard or corresponding portion of a non-keyboard instrument.

Visual representations refer to "life like" representations, or stylistic representations that symbolize the desired instrument, etc., in a manner that is readily understandable by the average person. Furthermore, visual representations of song may include the opening notes (or opening phrase) of the song and/or the written name of the song.

In a more advanced embodiment, the same music blocks may incorporate one or more sound makers into a block. In the simplest such embodiment, the sound maker is a reed that is tuned to the frequency of the note that the block represents. Activation of the reed may be by blowing air through an entry-exit hole, or in the case of a block made of flexible, non-porous material, activation of the reed may be by squeezing the block to force internal air out of the block by way of the reed and the hole/tube to which it is coupled. In a more complex embodiment, the sound maker 52 may comprise any electronic sound maker that in turn is controlled by a sound chip 54, where, again, the pitch of the electronic sound maker matches that of the note represented by the block. In an even more complex embodiment, the electronic sound maker and sound chip together produce a tone that substantially duplicates the sound of the piano or other instrument for the designated note by incorporation of the appropriate harmonics of the note's pitch, including the appropriate relative amplitudes of those harmonics. (Harmonics refer to various multiples of the pitch or frequency of a note.)

Activation of an electronic sound maker may be by any means known in the art, including but not limited to a push button or other switch, a motion-activated switch, a pressure-activated (for example, piezoelectric) switch, a mercury switch, a light activated switch, a temperature activated switch, a sound activated switch, etc. Such switches 51 typically incorporate appropriate sensors (for example, for heat, light, pressure, sound, etc.) that in turn are connected to a switch proper. Thus, a music block may sound when the temperature reaches the set point of the temperature sensor, for example; or when a loud noise is made, for example, the clapping of hands.

The cubic musical blocks of the present invention may be made of any conventional material that is safe for contact with human skin, such as wood, metal, various plastics, cardboard, rubber, firm or reinforced cloth or fabric, or any other suitable material. When the musical blocks are to be squeezable, the construction material may be of a flexible, non-porous material such as plastic, rubber, reinforced cloth, etc. Reinforced cloth or fabric may include cloth or fabric that covers a block made of any of the firmer materials.

The surface designations may be made on the sides of the musical cubes by any conventional means, as will be immediately apparent to those skilled in the art. For example, the depictions may be produced on the surface of one material and then attached to the surfaces of the block by conventional means, such as glue or other adhesive or other attachment means (for example, Velcro™, snap, clip, slide, etc.). Alternatively, the designations may be produced directly on the surfaces of the musical block by conventional means, such as ink, carving, etching, photoengraving, etc.

The size of the musical blocks may vary according to the intended user. For example, if the intended users are younger children or children whose motor functions are less developed, the musical blocks may be larger. Conversely, older children or children with more advance motor skills (i.e., more dextrous) may use smaller musical blocks.

Other embodiments of the present invention (not shown in the Figures) may utilize visual representations of virtually any musical instrument, such as oboe, flute, trombone, clarinet, trumpet, bass viola, harp, harmonica, saxophone, etc. In addition, when an electronic sound maker is used with a musical block designating an instrument, the sound of the specific note as well as the specific instrument may be produced by sounding the pitch of the designated note and the harmonics appropriate for the instrument, including the appropriate relative amplitudes of those harmonics.

Referring to FIGS. 2, 3 and 4, in embodiments incorporating the concepts of lengths of note or combinations of two or more notes, an electronic sound maker clearly could be used to reproduce the given combination of notes (including a whole song), and, again, with the sounds of the notes being specific for the musical instrument selected for the musical block. In FIG. 2, a B flat and an F sharp are featured, along with the F clef or bass clef.

In FIG. 3, whole and half A notes are shown, in addition to a G or treble clef

In FIG. 4, an eighth single A note is shown on two sides, and double or quadruple sixteenth note combinations are shown on the other sides.

In musical blocks with more than one note or more than one combination of notes, the electronic music makers may be activated by appropriately placed switches or other activation means.

In an alternative embodiment of the present invention, the musical blocks may incorporate additional sides that may be added on top of an existing original side(s), wherein such additional sides 1) feature additional notes and/or instruments from those on the underlying block, 2) include at least one sound chip imbedded within the additional side, wherein the sound chip may be programmed to sound one note or a combination of notes (including a whole song), and may also sound the note or combination of notes according to a selected musical instrument(s), 3) include connection means (pressure fitted electrical connection, for example) to provide electrical continuity with an internal battery 53 or other electrical energy source, 4) optionally may include an attachment means, including electrical connection means, for additional sides to be attached on top of the first attached additional side such that more than one note, and/or more than one instrument, may play either concurrently or in the sequence as added, and 5) optionally include voice programming, whereby the musical block may play back—including by singing—a name, word, sentence, or paragraph that is spoken into the musical block by a student or other user.

The attachment means may be by clip, snap, slide, magazine (into which one or more additional sides may slide, including in a stacked arrangement), etc., as will readily be apparent to one skilled in the art. In addition, electronic display devices (for example, LCD's, etc.) may be incorporated into the replaceable sides, wherein a single display may depict a musical score, one or more notes, a physical portion of a musical instrument, etc.

In yet another embodiment of the present invention, a programmable alarm clock may be incorporated into a musical block. Such an alarm clock may be activated to sound the selected note or combination of notes (as well as the selected instrument or combination of instruments) at the time dialed in. Alternatively, a light- and/or temperature-activated switch may be utilized where it is desired to have an alarm clock that awakens the user when the sun comes up, or when the temperature reaches the desired lower or upper temperature.

In another embodiment of the present invention, a series of programmable alarm clocks, each in a different musical block, may each include one or more sound chips which in turn may each sound a different note or combination of notes (including a whole song), and/or a different instrument or combination of instruments. Further, each block may contain an electromagnetic reception means, such as infrared, radio, visible light, ultrasonic, etc. Even further, a separate programmable unit may be employed such that any combination of sequences or concurrent combinations of notes and/or instruments may be activated when the alarm sounds, wherein the programmable unit transmits the selection via an electromagnetic propagation means that matches the electromagnetic reception means of the musical blocks. Similarly, a series of blocks may represent a series of musical instruments, which together may perform a symphony or other musical presentation. The electronic reception means may also be embedded within the replaceable sides. Thus, this embodiment will permit the user to program a selected series of individual notes or a selected series of note combinations (including whole songs) so as to create a song or a musical phrase, or even an entire concert in the desired combination—much like one may program the sequence of selections on one or more CD's in a multiple-CD player. Thus, the student may, for example, employ music blocks representing a range of instruments and thereby be able to determine which combination of instruments best accomplishes the desired sonics for a given music composition.

In addition, voice programming may be incorporated so that the user's name, for example, is sounded by spoken word or sung word when the alarm sounds, and this may be effected in combination with one or more notes being sounded, including a whole song. Voice programmin is effected by any conventional means well known in the art. For example, voice programming is used in a variety of children's toys and dolls.

Though the present invention has been described above according to the indicated embodiments, the skilled artisan will readily understand that additional embodiments may be performed without departing from the spirit and scope of the present invention as described.

I claim:

1. A music education apparatus comprising:
  a cubical block having six sides comprising three sets of opposing sides; and designations, wherein the designations:
    are identical on any one set of opposing sides;
    are different on each of the other sets of opposing sides;
    comprise visual representations of musical indicia of at least one musical note used in writing and playing music compositions;
  wherein the musical indicia on at least two sets of opposing sides correspond to the same at least one musical note; and wherein the visual representations of musical indicia are selected from the group comprising:
    at least one musical note between A and G located on a musical score, each musical note having a pitch;
    at least one letter between A and G, wherein the letter is identical to the musical note located on the musical score on the same musical block; and
  a representation of a physical portion of at least one musical instrument, wherein the physical portion comprises at least one highlighted sound initiator that corresponds to the at least one note and the at least one letter designated on the sets of opposing sides.

2. The music education apparatus according to claim 1, wherein the at least one sound initiator is selected from the group comprising a key, a string, a finger button, a key lever, and a finger hole.

3. The music education apparatus according to claim 1, wherein the at least one musical note is selected from the group comprising a whole note, a half note, a quarter note, an eighth note, and a sixteenth note.

4. The music education apparatus according to claim 1, wherein a different color is selected to correspond to each of the seven notes from A to G.

5. The music education apparatus according to claim 4, wherein different shades of each different color correspond to a different octave.

6. The music education apparatus according to claim 1, wherein the block comprises at least one sound maker for producing a sound that is at the frequency of the at least one musical note.

7. The music education apparatus according to claim 6, wherein the tone produced by the music generator further comprises at least one harmonic of the at least one note.

8. The music education apparatus according to claim 7, wherein the tone produces a sound substantially identical to a sound produced by the designated at least one musical instrument.

9. The music education apparatus according to claim 6, wherein the sound maker is electronic.

10. The music education apparatus according to claim 6, wherein the block further comprises a switch for activating the sound maker.

11. The music education apparatus according to claim 6, wherein the block further comprises at least one power source for energizing the sound maker.

12. The music education apparatus according to claim 11, wherein the power source comprises at least one member selected from the group comprising a battery, a solar cell, and AC electricity.

13. The music education apparatus according to claim 12, wherein the battery is rechargeable.

14. The music education apparatus according to claim 1, wherein the block comprises at least one sound maker for producing a sound that is at the frequency of the at least one musical note and at least one harmonic of the note.

15. A method of music instruction comprising:
   a. fabricating at least one cubical block having:
      six sides comprising three sets of opposing sides;
      designations, wherein the designations:
         are identical on any one set of opposing sides;
         are different on each of the other sets of opposing sides; and
      wherein the designations comprise visual representations of musical indicia used in writing and playing music compositions; and
         wherein the visual representations of musical indicia are selected from the group comprising:
         at least one musical note between A and G located on a musical score, each musical note having a pitch,
         at least one letter between A and G, wherein the letter is identical to the musical note located on the musical score on the same musical block;
         a representation of a physical portion of a musical instrument, wherein the physical portion comprises at least one highlighted sound initiator that corresponds to the at least one note and the at least one letter designated on the sets of opposing sides;
         a bass clef (F clef) located on a musical score;
         a treble clef (G clef) located on a musical score;
         a sharp located on a musical score;
         a flat located on a musical score; and
         a representation of at least one song; and
      at least one music generator that produces a tone that is substantially identical to the pitch of the at least one note designated on the sides of the block;
   b. activating the music generator of the at least one block; and
   c. noting the correspondences among:
      the designated at least one note between A and G;
      the position of the at least one note on the musical score;
      the position of the highlighted sound initiator on the representation of the physical portion of the at least one musical instrument; and
      the tone of the at least one note.

16. The method of music instruction according to claim 15, wherein the tone further comprises at least one harmonic of the at least one note.

17. The method of music instruction according to claim 16, wherein the tone produces a sound substantially identical to the sound produced by the designated musical instrument.

18. A music education apparatus comprising a set of at least seven blocks wherein
   at least one block designates the musical A by having on one side the letter A, on another side the staff position of the note A, and on yet another side showing the piano key corresponding to the note A;
   at least one block designates the musical note B by having on one side the letter B, on another side the staff position of the note B, and on yet another side showing the piano key corresponding to the note B;
   at least one block designates the musical note C by having on one side the letter C, on another side the staff position of the note C, and on yet another side showing the piano key corresponding to the note C;
   at least one block designates the musical note D by having on one side the letter D, on another side the staff position of the note D, and on yet another side showing the piano key corresponding to the note D;
   at least one block designates the musical note E by having on one side the letter E, on another side the staff position of the note E, and on yet another side showing the piano key corresponding to the note E;
   at least one block designates the musical note F by having on one side the letter F, on another side the staff position of the note F, and on yet another side showing the piano key corresponding to the note F; and
   at least one block designates the musical note G by having on one side the letter G, on another side the staff position of the note G, and on yet another side showing the piano key corresponding to the note G.

19. The music education apparatus of claim 18 wherein each block further comprises a power source, a sound source and a switch wherein the sound source is activated by the switch to give a sound corresponding to the note and the musical instrument designated thereon.

* * * * *